United States Patent [19]

Neumann et al.

[11] Patent Number: 4,670,503

[45] Date of Patent: Jun. 2, 1987

[54] AQUEOUS, PASTY COATING COMPOSITION AND THE USE THEREOF

[75] Inventors: Wolfgang Neumann, Waldkraiburg; Hans-Jürgen Hendriock, Burghausen, both of Fed. Rep. of Germany

[73] Assignee: Hoechst Aktiengesellschaft, Fed. Rep. of Germany

[21] Appl. No.: 909,614

[22] Filed: Sep. 19, 1986

[30] Foreign Application Priority Data

Sep. 21, 1985 [DE] Fed. Rep. of Germany ....... 3533807

[51] Int. Cl.$^4$ ............................................. C08L 27/16
[52] U.S. Cl. ..................................... 524/520; 524/300
[58] Field of Search .............................. 524/520, 300

[56] References Cited

U.S. PATENT DOCUMENTS

| | | | |
|---|---|---|---|
| 2,539,329 | 1/1951 | Sanders | 117/65 |
| 3,324,069 | 6/1967 | Koblitz et al. | 260/31.4 |
| 3,944,689 | 3/1976 | Luckock et al. | 427/385 |
| 4,141,873 | 2/1979 | Dohany | 428/500 |
| 4,400,487 | 8/1983 | Stoneberg et al. | 524/520 |
| 4,510,282 | 4/1985 | Goll | 524/520 |
| 4,557,977 | 12/1985 | Memmer et al. | 524/520 |

FOREIGN PATENT DOCUMENTS

| | | | |
|---|---|---|---|
| 7070145 | 10/1980 | Japan | 524/520 |
| 8063740 | 10/1981 | Japan | 524/520 |
| 841917 | 2/1957 | United Kingdom | 524/520 |
| 1027974 | 5/1966 | United Kingdom | 524/520 |

*Primary Examiner*—Paul R. Michl
*Assistant Examiner*—Peter D. Mulcahy
*Attorney, Agent, or Firm*—Connolly and Hutz

[57] ABSTRACT

Aqueous, pasty coating compositions containing a fluorine-containing copolymer formed from tetrafluoroethylene, vinylidene fluoride and hexafluoropropene and a polyacrylate thickener which is composed of an essentially noncrosslinked copolymer of acrylic acid or methacrylic acid and which has a viscosity of 4 to 40 mPa s in a 1% strength by weight solution in aqueous ammonia at a pH of 9 at a shear rate of 1,000 s$^{-1}$ are described. The coating compositions are particularly suitable for application to textile substrates by means of the brushing process.

9 Claims, No Drawings

AQUEOUS, PASTY COATING COMPOSITION AND THE USE THEREOF

The invention relates to an aqueous, pasty coating composition based on a fluorine-containing copolymer formed from tetrafluoroethylene (TFE), vinylidene fluoride (VDF) and hexafluoropropene (HFP), and to the use thereof.

It has been known for a long time to coat and impregnate glass or textile fabrics with polymers of tetrafluoroethylene in the form of aqueous, colloidal dispersions. It was already known at an early stage in this regard that the formation of mud cracks constitutes a considerable disadvantage in building up such coatings. Reference was already made in U.S. Pat. No. 2,539,329 to the fact that, when concentrated PTFE dispersions are applied in thick layers, the tendency to the formation of cracks increases so greatly as the thickness of the layer applied in a coating process increases that thick layers of a satisfactory quality can only be obtained by stagewise application of a fairly large number of thin layers. This method is, however, just as unsatisfactory as the proposal made in the said U.S. patent to calender and heat the thick layer in order to eliminate the cracks. The successive application of several thin layers has also been suggested as a matter of priority (see, for example, British Patent No. 841,917) for the application of copolymers of TFE which can be processed from the melt, such as, for example, copolymers of this type formed from TFE and HFP. Attempts have also already been made to mix hydrophilic, film-forming thickening and filmforming agents, such as, for example, alkali metal salts of polyacrylates or polymethacrylates, into PTFE dispersions, and to coat glass fiber fabrics by this means, as is described, for example, in French Patent No. 1,139,928. However, it is not possible to achieve thick coatings entirely without cracks by this method either. Above all, it is necessary to heat the coatings obtained by means of such mixtures to temperatures over 350° C. in order to sinter the perfluorinated polymer, which causes the film-forming polymer to decompose and volatilize, and frequently results in an undesirable porosity in such coatings. Perfluorinated polymers also have only a limited suitability for coating textile fabrics, since it is either necessary for the sintering to be carried out with very special precautionary measures or it is necessary to select, at the outset, fabrics composed of fibers resistant to high temperatures.

The mixing of polyvinylidene fluoride or copolymers which contain mainly vinylidene fluoride and which can therefore be baked at fairly low temperatures with "latent" solvents and acrylate or methacrylate polymers, and the preparation of coatings therefrom has also already been described (see U.S. Pat. Nos. 3,324,069 and 3,944,689). Large amounts of acrylate and/or methacrylate polymers are added in this process, and, as a result of this "dilution", the dirt-repellent and the anti-adhesion properties of the coating of vinylidene fluoride polymers are inevitably reduced. Coating by means of a coating composition containing solely or predominantly organic solvents also entails considerable problems in respect of handling large quantities of solvents during processing and the removal or recovery of the latter after coating.

Efforts are therefore being made to change to aqueous dispersions. European Patent No. 57,813 describes aqueous coating compositions containing polyvinylidene fluoride and acrylate copolymers, the latter being present in an amount of 7 to 50% by weight, relative to the sum of the two polymers. It is evident, however, that the acrylate polymers employed are inadequate in respect of thickening properties, since it is stated to be preferable also to add an additional polyacrylate thickener, as a result of which, however, the total concentration of acrylate polymers, relative to the sum of all the polymers including PVDF, rises to at least 9% by weight.

Furthermore, German Patent No. 2,325,304 discloses coating agents which are mixtures of PVDF and polyacrylates in an aqueous formulation, the polyacrylate, however, amounting to an even higher proportion, 10 to 75% by weight, relative to the total weight of the two polymers. PVDF in this case is to be understood as meaning also copolymers of VDF with, inter alia, TFE and/or HFP, VDF being, however, present to the extent of at least 75 mol% of the copolymerized units, i.e. these are copolymers having substantially elastomeric properties.

These known coating compositions thus exhibit the following disadvantages: PVDF tends to produce hard coatings tending to be brittle. This tendency can be overcome by adding large amounts of acrylate polymers, in some cases other plasticizers are also added in addition. PVDF and copolymers containing mainly VDF can be baked at relatively low temperatures, but, because of the high proportion of hydrogen in their chains, are not entirely equal to the highly fluorinated polymers in respect of the properties typical of fluorinated polymers, such as resistance to chemicals and anti-adhesion properties. This difference rapidly becomes greater when coatings contain large amounts of non-fluorinated polymers, such as, for example, polyacrylates. On the other hand, highly fluorinated polymers such as PTFE are not suitable for sensitive fabrics because of their high baking temperatures, and exhibit unfavorable film-forming properties which do not permit the application of relatively thick layers in a single coating.

As before, there is, therefore, a need for an aqueous coating composition, preferably for textile fabrics, which is based on polymers of the highest possible fluorine content and which should also be suitable for fabrics which are only stable up to moderately high temperatures, in which connection it is desirable to have highly viscous, brushable formulations which can be applied in relatively thick layers in a single application without the formation of cracks.

In accordance with the present invention, this need is met by an aqueous, pasty coating composition of the type mentioned initially which is composed of:
(a) 30 to 60 parts by weight of a mixture of polymers composed of
  $a^{1)}$ 99.9 to 98.5% by weight, relative to the sum of $a^{1)}$ plus $a^{2)}$, of a copolymer formed from 45 to 65% by weight of copolymerized units of TFE, 35 to 20% by weight of copolymerized units of VDF and 20 to 10% by weight of copolymerized units of HFP, and
  $a^{2)}$ 0.1 to 1.5% by weight, relative to the sum of $a^{1)}$ plus $a^{2)}$, of a thickener composed of an essentially non-crosslinked copolymer of acrylic acid or methacrylic acid which, in a 1% strength by weight solution in aqueous ammonia, at a pH of 9 and at a shear rate of 1,000 s$^{-1}$, has a viscosity of 5 to 40 mPa s, measured by means of a rotational viscometer at 20° C., (b) 30 to 60 parts by weight of water, and (c) 1 to 5 parts by weight of an anionic or nonionic wetting agent as a stabilizer for the dispersion, the pH of the coating composition being adjusted by means of alkali or ammonia to a value of 7 to 10.

The copolymers formed from TFE, VDF and HFP and processes for their preparation are known to those skilled in the art. The preparation of colloidal, aqueous dispersions of such copolymers is described, for example, in U.S. Pat. No. 4,335,238. It follows the customary process for copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

The metered addition of the monomers in this process should be in accordance with the composition desired for the copolymer. This composition is 45 to 65% by weight of copolymerized units of TFE, 20 to 35% by weight of copolymerized units of VDF and 10 to 20% by weight of copolymerized units of HFP, the individual proportions being selected in such a way that they add up to 100% by weight. Terpolymers of this type in which TFE is the predominant constituent have pronounced thermoplastic properties. They have a melting point of 130° to 170° C., measured by the DSC method ("Differential Scanning Calorimetry") and a value of 50 to 250 g/10 minutes for the melt index, measured at 265° C. and at a loading of 11 kp. For the application of the aqueous, pasty coating compositions according to the invention it is necessary to concentrate the diluted, aqueous, colloidal dispersions of these copolymers obtained from the polymerization, which can be effected by known processes, such as, for example, by gentle evaporation in vacuo (U.S. Pat. No. 3,316,201), by electrodecantation (British Patent No. 642,025) or by ultrafiltration (U.S. Pat. No. 4,369,266). In these processes, a nonionic or anionic dispersion stabilizer is added to the dispersion. Known wetting agents, such as alkoxylated alkylphenols or alkali metal or ammonium laurylsulfates can be used for this purpose; preferably these are the ammonium salts of alkanecarboxylic acids having 10 to 14 carbon atoms, especially ammonium laurate.

In combination with these copolymers, the coating composition according to the invention contains a thickener which is an essentially non-crosslinked copolymer of acrylic or methacrylic acid. In this context, the term "essentially non-crosslinked" is intended to include insignificant, negligible proportions of crosslinkages in such copolymers. This copolymer should have a viscosity of 5 to 40, preferably 10 to 30, mPa s, measured on a 1% strength by weight solution in aqueous ammonia at a pH of 9 and a shear rate of $1,000 \text{ s}^{-1}$ at 20° C. by means of a rotational viscometer. The essentially non-crosslinked copolymers of acrylic or methacrylic acid are copolymers which, in addition to copolymerized units belonging to the group of acrylic and methacrylic acid or mixtures thereof, also contain copolymerized units of at least one ester of acrylic or methacrylic acid with an alkanol having 1 to 10, preferably 1 to 5, carbon atoms in the polymer chain. Copolymers of acrylic acid with ethyl or butyl acrylate, or terpolymers containing both of the ester comonomers and having a suitably adjusted viscosity are particularly suitable.

It is extremely surprising that thickeners which, in themselves, are formulations of relatively low viscosity and are hardly crosslinked are suitable for the coating compositions according to the invention, and that it is thereby possible to obtain high-viscosity, brushable pastes by means of the said copolymers of TFE, VDF and HFP. Usually a good thickening effect is obtained by means of crosslinked and/or highly viscous thickeners. Although it is possible, in principle, also to use polyacrylate thickeners which have a fairly high viscosity and/or are highly crosslinked together with the said copolymers, it is not possible thereby to realise the desired effect of managing with the minimum of thickener. By contrast, a brushable paste having a high viscosity of 500 to 5,000 mPa s, measured at a shear rate of $50 \text{ s}^{-1}$ and a temperature of 20° C. by means of a rotational viscometer is obtainable by means of the thickener employed in accordance with the invention after a time of 24 hours, calculated from the time of mixing.

The preparation of the pasty coating agent according to the invention is preferably effected by first, if necessary, adding additional wetting agent to the concentrated aqueous dispersion of the copolymer of TFE, VDF and HFP, if the required amount is not already present after the concentration of the copolymer dispersion. The pH of this dispersion is then adjusted to the required value of 7 to 10, preferably 8 to 9, by means of alkalis such as NaOH or ammonia, if the dispersion does not already have this degree of alkalinity. The thickener is then added, with stirring, in the form of an aqueous emulsion and in an amount of 0.1 to 1.5, preferably 0.3 to 1.0, % by weight, quoted as polymer solids, relative to the sum of the polymer solids $a^{1)}$ plus $a^{2)}$. The viscosity immediately increases greatly until a pasty character is reached; on further stirring the increase slows down to give values of 500 to 5,000 mPa s, measured at a shear rate of $50 \text{ s}^{-1}$ and a temperature of 20° C., these values being reached after a time of about 24 hours.

The aqueous, pasty coating compositions according to the invention can contain customary and known additives. In order to achieve uniform distribution, it is expedient to incorporate these additives, if appropriate by attrition, for example in a pearl mill, before the thickener is added to the copolymer dispersion.

Additives of this type are, in particular, fillers and pigments, also including those which effect a certain light-stabilization against UV radiation, the usual amount being up to 15% by weight. Examples which may be mentioned are carbon black, silicates, such as talc or mica, iron oxides, zinc oxide, barium sulfate, chromium oxide, other metal oxides and metal sulfides, glass fibers, powdered glass, glass spheres, metals in the form of powders, flakes or spangles, pearlescent pigments, chrome yellow or cadmium yellow, cadmium red and organic dyestuffs, such as phthalocyanine, naphthol or toluidine dyestuffs. Titanium dioxide, particularly the rutile type, is particularly preferred as a pigment and filler. Further additives are special light stabilizers, such as, for example, benzotriazole derivatives, flame-retarding additives, such as antimony trioxide or aluminum hydroxide, anti-foaming agents based on silicones or humectants, such as ethylene glycol or ethylene glycol ethers.

The pasty coating compositions according to the invention are particularly suitable for coating all types of sheetlike structures based on natural or synthetic fibers or filaments, and also mineral fibers, such as, for example, glass, ceramics or asbestos fibers, carbon fibers or metal fibers. These can be fabrics, other types of sheet-like structures, such as, for example, nets, or nonwoven fleeces, laid structures or fabrics. Sheet-like structures of this type can be composed, for example, of natural fibers, such as cotton, of semi-synthetic fibers or filaments, such as those of staple or filament rayon or artificial silk, or of fully synthetic fibers or filaments, such as those of polyacrylonitrile, polyamides and polyesters, and also fluorinated polymers, such as, for example, polytetrafluoroethylene. Polyester woven fabric is particularly preferred for coating.

The pasty coating compositions according to the invention are applied to the textile substrate material by means of customary application processes, such as rolling, spreading by means of a doctor knife, dipping followed by wiping or screen printing. These coating compositions are preferentially suitable for application by spreading processes by means of a floating knife or metal knife. After application, the coating is dried and baked at temperatures of 180° to 210° C., depending on the particular composition of the textile substrate, for several minutes (generally 3 to 15 minutes). After the drying process, an additional treatment of the surface can, if appropriate, be carried out, for example by means of heated smoothing rolls under pressure loading or by means of texturizing rolls, at temperatures of 160° to 210° C.

Applied quantities of 50 to 200 g/m$^2$, depending on the solids content, the viscosity and the application process, can be obtained per operation (coating) using the pasty coating compositions according to the invention, which corresponds to a layer thickness of 25 to 100 μm. Composite systems obtained in this manner can contain up to 75% by weight of coating material, relative to the total weight of the coating plus the substrate material.

The resulting coatings are distinguished by excellent adhesion to the underlying textile substrate, by freedom from cracks and pores, by smoothness and, in combination with the substrate material, by a soft handle and high flexibility. The composite systems obtained by means of the pasty coating compositions according to the invention possess a high resistance to weathering, and service life, good anti-adhesion properties and dirt-repellent behavior and also a high resistance to chemicals, solvents and the like. In comparison with polytetrafluoroethylene coatings, a particular advantage is the distinctly reduced effort in the coating process and, in addition, the ability to be able to coat, in this process, even textile substrates which are considerably more sensitive to heat. The pasty coating compositions according to the invention contain no organic solvents or plasticizers, so that there is no possibility of environmental pollution caused by such substances.

By virtue of the properties mentioned above, the coating compositions according to the invention and the composite materials produced by means of them are suitable for numerous uses, above all in the external field and for the field of textile construction, as it is called. The following may be mentioned as examples of the use of the composite materials according to the invention: airinflated structures, roofing webs, prestressed structures, partitions, silos and the like. The following can also be manufactured therefrom: tent awnings, swimming pool linings, tarpaulins, for example for cargo trucks, container casings, conveyor belts and band conveyors, protective clothing and the like.

The viscosity measurements mentioned above and in the following examples were carried out using a Rheomat 108 rotational viscometer made by Contraves AG, Zurich (Switzerland), at a temperature of 20° C, using measuring elements 1 to 3 (diameters 14, 24 and 30 mm).

The following examples are intended to illustrate the invention:

EXAMPLE 1

A copolymer dispersion containing 50% by weight of solids is employed for the preparation of the aqueous, pasty coating composition. The copolymer is composed of 55% by weight of tetrafluoroethylene, 30% by weight of vinylidene fluoride and 15% by weight of hexafluoropropene, and has a DSC melting point of 153° C.

A coating composition of the following formulation is prepared using this copolymer dispersion:
46.4% by weight of the copolymer defined above,
0.3% by weight of thickener (=0.6% by weight, relative to the sum of copolymer plus thickener),
43.5% by weight of water,
2.8% by weight of ammonium laurate (wetting agent),
1.9% by weight of titanium dioxide,
5.0% by weight of antimony trioxide and
0.1% by weight of silicone anti-foaming agent.

Preparation is carried out by first stirring the titanium dioxide and antimony trioxide, with the addition of the anti-foaming agent, into the copolymer dispersion by means of a propeller stirrer, grinding the mixture on a pearl mill and then adjusting the pH of the dispersion to a value of 9 by means of ammonia. The thickening agent is then added with further continuous stirring. The thickening agent employed is a 15% strength by weight dispersion of a non-crosslinked copolymer formed from methacrylic acid, ethyl acrylate and n-butyl acrylate in an aqueous ammonia medium, the dispersion having a viscosity of 15 mPa s in the form of a 1% strength by weight solution in aqueous ammonia at a pH of 9 and at a shear rate of 1,000 s$^{-1}$.

After 24 hours, the aqueous pasty coating composition thus prepared has a viscosity of 1,030 mPa s, measured at 20° C. and at a shear rate of 50 s$^{-1}$. It is applied twice to each side of a polyester fabric of the specification below by means of a laboratory doctor knife, the adhesive layer by means of a floating-knife and the top layer by means of a metal knife (model SV laboratory coating apparatus made by Mathis, Niederhasli bei Zürich, Switzerland). Polyester fabric: washed and thermofixed at 200° C.; thread count (ends/picks) 9/9 cm$^{-1}$; thread gauge 1,100 dtex; weight per unit area 210 g/m$^2$.

The resulting quantity applied is 385 g/m$^2$ or 64.7%, relative to the weight of the laminate. The coating is baked for 5 minutes at 200° C. after the first coat and for 10 minutes at 200° C. after the second coat.

EXAMPLE 2

A coating composition of the following formulation is prepared using the copolymer dispersion and the thickener described in Example 1 (the latter employed here as a 30% strength by weight dispersion):
51.8% by weight of the copolymer from Example 1,
0.3% by weight of the thickener from Example 1 (=0.6% by weight, relative to the sum of copolymer plus thickener), 45.3% by weight of water and
2.6% by weight of nonionic wetting agent (®Triton×100).

After 24 hours, this coating composition has a viscosity of 750 mPa s at a shear rate of 50 s$^{-1}$ and at 20° C.. Three coatings of it are applied by means of a laboratory coating doctor to one side of a glass fiber fabric (β-glass). The material is baked for 3 minutes at 200° C. after the first coat and for 10 minutes at 200° C. after the second coat. The resulting quantity applied is 265 g/m$^2$, corresponding to a layer thickness per coat of 45 μm. The composite material is transparent and flexible.

EXAMPLE 3

A coating composition of the following formulation is prepared using the copolymer dispersion described in Example 1:
49.8% by weight of the copolymer from Example 1,
2.5% by weight of nonionic wetting agent (®Triton×100),
47.4% by weight of water and
0.3% by weight of thickener (=0.6% by weight, relative to the sum of copolymer plus thickener).

The thickener is an aqueous methacrylate dispersion containing free carboxyl groups (PAS 9826D made by Degussa, Hanau, West Germany) containing 30% by weight of solids. When diluted to 1% strength by weight and adjusted to pH 9, the dispersion has a viscosity of 55 mPa s, measured at 20° C. and at a shear rate of 1,000 s$^{-1}$.

A readily brushable paste having a viscosity of 1,400 mPa s at a shear rate of 1,000 s$^{-1}$ at 20° C. is formed in the course of 24 hours.

COMPARISON EXAMPLE A

The same copolymer dispersion as in Example 1 is employed and is used to prepare a coating composition of the same formulation as in Example 1, but with the difference that in this case a highly crosslinked thickener consisting of the same comonomers (methacrylic acid, ethyl acrylate and n-butyl acrylate) and having a viscosity of 150 mPa s, measured in an aqueous ammonia solution at pH 9 and 20° C. at a shear rate of 1,000 s$^{-1}$ is added as a constituent to the coating composition. With this, the coating composition only reaches a viscosity of 45 mPa s, measured at a shear rate of 50 s$^{-1}$ at 20° C., is reached after 24 hours. This mixture is not brushable.

COMPARISON EXAMPLE B

A coating composition of the following formulation is prepared:
54.9% by weight of polytetrafluoroethylene (homopolymer),
2.7% by weight of nonionic wetting agent (®Triton×100),
42.1% by weight of water and
0.3% by weight of thickener (=0.6% by weight, relative to the sum of PTFE plus thickener).

The polytetrafluoroethylene added is a concentrated, aqueous, colloidal dispersion, containing 55% by weight of solids, of a tetrafluoroethylene homopolymer prepared by emulsion polymerization. The thickener is the same as that defined in Example 1. The coating composition thus prepared only has a viscosity of 230 mPa s at a shear rate of 50 s$^{-1}$ at 20° C.

We claim:

1. An aqueous, pasty coating composition based on a fluorine-containing copolymer formed from tetrafluoroethylene (TFE), vinylidene fluoride (VDF) and hexafluoropropene (HFP) and on a polyacrylate thickener, which comprises:
(a) 30 to 60 parts by weight of a mixture of polymers composed of
   a$^{1)}$ 99.9 to 98.5% by weight, relative to the sum of a$^{1)}$ plus a$^{2)}$, of a copolymer formed from 45 to 65% by weight of copolymerized units of TFE, 35 to 20% by weight of copolymerized units of VDF and 20 to 10% by weight of copolymerized units of HFP, and
   a$^{2)}$ 0.1 to 1.5% by weight, relative to the sum of a$^{1)}$ plus a$^{2)}$, of a thickener comprised essentially of an essentially non-crosslinked copolymer of acrylic acid or methacrylic acid or combinations thereof and acrylic or methacrylic acid esters, which copolymers, in a 1% strength by weight solution in aqueous ammonia, at a pH of 9 and at a shear rate of 1,000 s$^{-1}$, has a viscosity of 5 to 40 mPa s, measured by means of a rotational viscometer at 20° C.,
(b) 30 to 60 parts by weight of water, and
(c) 1 to 5 parts by weight of an anionic or nonionic wetting agent as a stabilizer for the dispersion, the pH of the coating composition being adjusted by means of alkali or ammonia to a value of 7 to 10.

2. An aqueous, pasty coating composition as claimed in claim 1, wherein the mixture of polymers in component (a) is composed of 99.7 to 99.0% by weight of the copolymer a$^{1)}$ and of 0.3 to 1.0% by weight of the thickener a$^{2)}$.

3. An aqueous, pasty coating composition as claimed in claim 1, wherein the thickener a$^{2)}$ as claimed in claim 1 has a viscosity of 10 to 30 mPa s under the conditions defined therein.

4. An aqueous, pasty coating composition as claimed in claim 1, wherein the thickener a$^{2)}$ composed of an essentially non-crosslinked copolymer of acrylic or methacrylic acid is a copolymer which, in addition to copolymerized units belonging to the group of acrylic and methacrylic acid or mixtures thereof, also contains, additionally, copolymerized units of at least one acrylic or methacrylic acid ester having 1 to 10 carbon atoms in the alcohol component of the ester.

5. An aqueous, pasty coating composition as claimed in claim 1, wherein the wetting agent in component (c) is an ammonium salt of an alkanecarboxylic acid having 10 to 14 carbon atoms.

6. An aqueous, pasty coating composition as claimed in claim 1, wherein the coating composition contains customary pigments and fillers.

7. An aqueous, pasty coating composition as claimed in claim 1, wherein the pigment is finely ground rutile.

8. An aqueous, pasty coating composition as claimed in claim 1, which contains antimony trioxide as a flame-retarding agent.

9. In the method of coating woven or non-woven fabrics, wherein the improvement comprises obtaining thick-layer coatings from the coating composition as claimed in claim 1.

* * * * *